US012477344B2

(12) United States Patent
Govier et al.

(10) Patent No.: US 12,477,344 B2
(45) Date of Patent: Nov. 18, 2025

(54) DATA MESSAGING QUALITY CHECK TOOL

(71) Applicant: T-Mobile Innovations LLC, Overland Park, KS (US)

(72) Inventors: Marc Leroy Govier, Overland Park, KS (US); Bradley Heckey, Overland Park, KS (US); Seeba Philip Perincheril, Maple Valley, WA (US); Stephen Michael Shiflet, Rowlett, TX (US)

(73) Assignee: T-Mobile Innovations LLC

( * ) Notice: Subject to any disclaimer, the term of this patent is extended or adjusted under 35 U.S.C. 154(b) by 553 days.

(21) Appl. No.: 17/963,948

(22) Filed: Oct. 11, 2022

(65) Prior Publication Data

US 2024/0121617 A1    Apr. 11, 2024

(51) Int. Cl.
*G06N 5/02*       (2023.01)
*G06N 5/025*      (2023.01)
*H04W 12/80*      (2021.01)

(52) U.S. Cl.
CPC ............ *H04W 12/80* (2021.01); *G06N 5/025* (2013.01); *G06N 5/027* (2013.01)

(58) Field of Classification Search
CPC ................................. H04W 12/80; G06N 5/02
See application file for complete search history.

(56) References Cited

U.S. PATENT DOCUMENTS

| | | | |
|---|---|---|---|
| 9,432,407 B1* | 8/2016 | Brandwine | ........... H04L 67/564 |
| 2008/0276294 A1* | 11/2008 | Brady | ................... H04W 12/02 |
| | | | 726/1 |
| 2012/0096145 A1* | 4/2012 | Le | ........................ G06Q 50/265 |
| | | | 709/224 |

* cited by examiner

*Primary Examiner* — Michael T Vu

(57) ABSTRACT

A data message quality check system that performs deep packet inspection on data messages after they have been constructed and sent towards a final receiver. The system comprises a plurality of mediation devices configured to generate data messages in accordance with a predefined format and to embed contextual information in a header of the data messages; and a data message quality check system configured to receive the data messages from the mediation devices, configured to perform deep packet inspection (DPI) on each of the data messages, configured to determine whether the data messages satisfy quality criteria, configured to transmit data messages that satisfy quality criteria to the final receiver, and quarantining data messages that do not satisfy quality criteria.

20 Claims, 7 Drawing Sheets

DATA MESSAGING QUALITY CHECK TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The communications assistance for law enforcement act (CALEA) was enacted by the United States Congress in 1994 to require that telecommunications carriers and manufacturers of telecommunications equipment design their equipment, facilities, and services to ensure that they have capabilities to comply with legal requests for information. Carriers respond to legal warrants for CALEA communications intercepts by provisioning network equipment to perform the communication intercept mandated by the warrants, capturing qualified communications, and forwarding the subject communication according to a standard format to the law enforcement agencies identified in the warrants. Such legal warrants for CALEA intercepts are very specific about what kind of information is to be intercepted and forwarded to law enforcement agencies as well as identifying specific periods of time during which the warrant is active. One of the objects of the CALEA legislation was to protect the privacy and security of communications and call-identifying information not authorized to be intercepted.

SUMMARY

In an embodiment, a data message quality check system that performs deep packet inspection on data messages after they have been constructed and sent towards a final receiver is disclosed. The system comprises a plurality of mediation devices configured to generate data messages in accordance with a predefined format and to embed contextual information in a header of the data messages; and a data message quality check system configured to receive the data messages from the mediation devices, configured to perform deep packet inspection (DPI) on each of the data messages, configured to determine whether the data messages satisfy quality criteria, configured to transmit data messages that satisfy quality criteria to the final receiver, and quarantining data messages that do not satisfy quality criteria.

In an embodiment, a communications assistance for law enforcement act (CALEA) communication intercept system is disclosed. The system comprises a plurality of mediation devices configured to receive intercepted communications from communication network nodes, wherein the communications are intercepted pursuant to CALEA operations, configured to encapsulate each intercepted communication in a handover interface 2 (HI2) message or in a handover interface 3 (HI3) message that comprises a header identifying a CALEA case identity and metadata about the intercepted communication, and configured to transmit the HI2 messages and the HI3 messages; and a CALEA quality check system configured to receive the HI2 messages and the HI3 messages from the mediation devices, configured to perform deep packet inspection (DPI) on each of the HI2 messages to determine an identity of a user associated with the HI2 message, configured to determine if the user is targeted by a CALEA operation associated with the CALEA case identity in the header of the HI2 message, configured to transmit the HI2 message to a law enforcement agency associated with the CALEA case identity in the header of the HI2 message when the user is targeted by the CALEA operation associated with the CALEA case identity in the header of the HI2 message, configured to quarantine the HI2 message when the user is not targeted by the CALEA operation associated with the CALEA case identity in the header of the HI2 message, configured to perform DPI on each of the HI3 messages to determine an identity of a user associated with the HI3 message, configured to determine if the user is targeted by a CALEA operation associated with the CALEA case identity in the header of the HI3 message, configured to transmit the HI3 message to a law enforcement agency associated with the CALEA case identity in the header of the HI3 message when the user is targeted by the CALEA operation associated with the CALEA case identity in the header of the HI3 message, configured to quarantine the HI3 message when the user is not targeted by the CALEA operation associated with the CALEA case identity in the header of the HI3 message, wherein quarantining HI2 messages and quarantining HI3 messages prevents the HI2 messages and the HI3 messages being transmitted to a law enforcement agency and transmits a notification to employees of a communication service provider operating the CALEA communication intercept system for investigation.

In another embodiment, a method of handling communications intercepts produced by a communication network to assure compliance with communications assistance for law enforcement act (CALEA) requests is disclosed. The method comprises receiving a CALEA request by a CALEA provisioning tool, wherein the CALEA request identifies a law enforcement agency, a CALEA case identity, and a communication target identity; provisioning communication network nodes by the CALEA provisioning tool to intercept communications associated with the communication target identity; and receiving a first communication intercept by a CALEA mediation device, wherein the first communication intercept comprises a first communication content, the CALEA case identity, and the communication target identity. The method further comprises encapsulating the first communication content of the first communication intercept in a first handover interface (HI) message based on the law enforcement agency associated with the CALEA case identity by the CALEA mediation device; adding the CALEA case identity and the communication target identity into a first header of the first HI message by the CALEA mediation device; and transmitting the first HI message by the CALEA mediation device to a CALEA quality check tool. The method further comprises analyzing the first HI message by the CALEA quality check tool to determine if the first communication content in the first HI message comprises private information about a non-targeted communication user; and, when the first communication content in the first HI message does not comprise private information about a non-targeted communication user, transmitting the first HI message by the CALEA quality check tool to the law enforcement identified in the CALEA request.

In yet another embodiment, a method of handling communications intercepts produced by a communication network to assure compliance with communications assistance for law enforcement act (CALEA) requests is disclosed. The method comprises receiving a first communication intercept by a CALEA mediation device from a communication network node, wherein the first communication intercept comprises a first communication content, a CALEA case identity, and a communication target identity; transmitting a first handover interface (HI) message by the CALEA mediation device to a CALEA quality check tool, wherein the HI message comprises the first communication content, the CALEA case identity, and the communication target identity; and analyzing the first HI message by a rules engine of the CALEA quality check tool based on a plurality of CALEA message quality rules. The method further comprises determining by the rules engine that the first HI message violates at least one of the plurality of CALEA message quality rules; storing the first HI message along with one or more findings of the rules engine by the CALEA quality check tool in a secure quarantine datastore; and transmitting a notification by the CALEA quality check tool to communication service provider CALEA employees for remediation.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
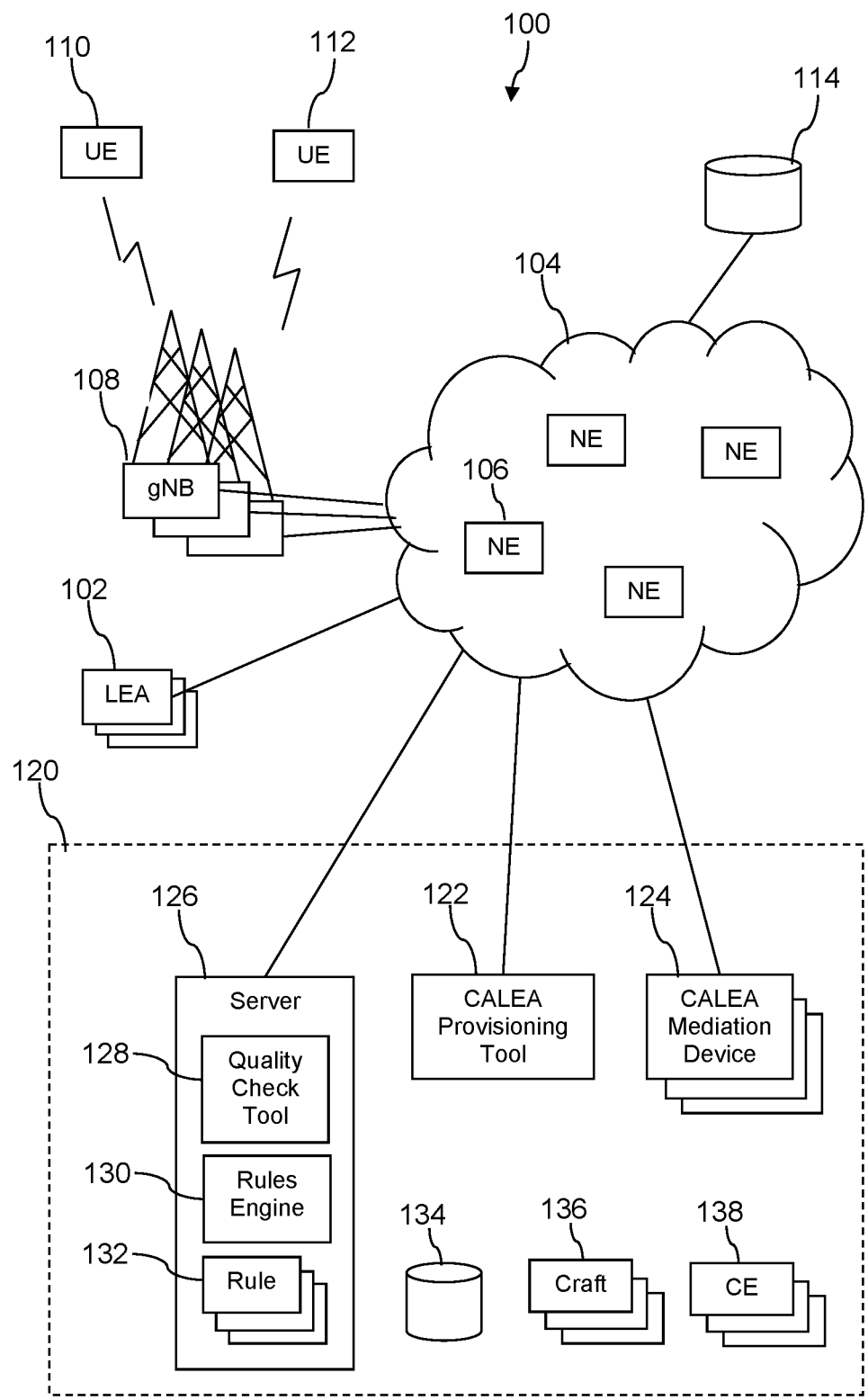
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The present disclosure teaches a data message quality check tool that analyzes messages and performs quality checks on them. In an embodiment, the messages are generated by a plurality of mediation devices that are configured to generate data messages in accordance with a predefined format and to embed contextual information in a header of the data messages. In an embodiment, the data message quality check tool performs quality checks on the data messages based on a rules engine executing message quality rules. If a message does not pass the check, the message may be held back rather than be sent on to its intended destination. The rules may be provided as data that are read when a rules engine is first launched. The processing of the rules engine may then be updated simply by revising the data or adding to the data and bouncing the server on which the rules engine executes. The rules engine reads the new data and executes quality checks based on the updated rules data.

In an embodiment, the data message quality check system comprises a plurality of mediation devices configured to generate data messages in accordance with a predefined format and to embed contextual information in a header of the data messages; and a data message quality check system configured to receive the data messages from the mediation devices, configured to perform deep packet inspection (DPI) on each of the data messages, configured to determine whether the data messages satisfy quality criteria, configured to transmit data messages that satisfy quality criteria to the final receiver, and quarantining data messages that do not satisfy quality criteria.

In an embodiment, the quality check tool can reduce errors in complying with CALEA warrants, producing data messages that comply with predefined standard formats, and protect privacy of subscribers. In an embodiment, telecommunications network nodes are provisioned to perform CALEA communications intercept in accordance with a valid warrant. The intercepted communications is passed from the network node to an intercept infrastructure that formats the intercepted communications in accordance with a standards defined format. This formatted intercepted communication may comprise HI2 information (e.g., context information about the communication or metadata) and/or HI3 information (e.g., communication content). The formatted intercepted communication is passed from the intercept infrastructure to the CALEA quality check tool that analyzes the formatted intercepted communication to assure that it complies with the restrictions of the subject warrant, that the formatting requirements are satisfied, and that the communication itself is in accord with communication standards. Formatted intercepted communications that do not pass the quality check are not sent to law enforcement agencies, and the formatted intercepted communication is quarantined. A responsible party within the telecommunication carrier organization is assigned to analyze the incident and determine a root cause for the failure. Once a root cause is determined, network equipment can be fixed to avoid future errors in intercepted communications. A telecommunication carrier may be a communication service provider such as a wireless communication service provider.

In an embodiment, the CALEA quality check tool comprises a rules engine that reads rules defined in a data artifact (e.g., in a file or other structure) upon instantiation and/or upon control command. The rules engine analyzes each formatted intercept communication received from the intercept infrastructure according to the rules and takes action accordingly (e.g., either passes on to the appropriate law enforcement agency or quarantines the communication and alerts a responsible party in the telecommunication carrier organization). In this way, the CALEA quality check can be easily updated simply by adding a new rule when needed to respond to a newly identified error scenario.

A possible CALEA error can result in the following hypothetical scenario. A non-targeted subscriber device attaches to a wireless radio access network (RAN). The network assigns a transient IP address to the non-targeted subscriber's device. IP packets are sent by a computer to the IP address, but before these IP packets are delivered, the device associated with the non-targeted subscriber detaches from the RAN. The device of a targeted subscriber attaches to the RAN, and the network assigns the transient IP address previously assigned to the non-targeted subscriber device to the device of the targeted subscriber. The network then forwards the IP packets (created at the time when the device of the non-targeted subscriber was associated with the transient IP address) to the device of the targeted subscriber. Because the IP packets are recognized by the device of the non-targeted subscriber as not actually directed to that device, it likely drops these IP packets and never processes them further. But the communication network intercepts these IP packets that were actually delivered to this device and forwards them to the CALEA intercept infrastructure. The CALEA intercept infrastructure may then format this communication and forward it on to a law enforcement agency as though it was communication associated with the targeted subscriber even though it was actually associated with the non-targeted subscriber. In an embodiment, the CALEA quality check tool is configured with a rule that checks for proper association of IP packets delivered to a device of a targeted subscriber to assure that this particular error scenario has not occurred. For example, the CALEA quality check tool may perform a deep packet inspection and determine a phone number associated with the device to which the IP packet is intended to be directed. If the phone number found is not associated with the targeted subscriber, the CALEA quality check tool can block sending the IP packet on to the law enforcement agency.

Another possible CALEA error can happen when HI3 intercept data is sent decoupled from its associated HI2 intercept data. Law enforcement agencies cannot process raw communication content (HI3 data) without the context of the communication content (HI2 data). In an embodiment, the CALEA quality check tool is configured with a rule that checks to make sure that HI3 data is paralleled with HI2 data before it is sent to the law enforcement agency. If the HI3 data is not paralleled with the HI2 data, the intercept data is not sent to the law enforcement agency, the intercept data is quarantined, and a responsible party at the telecommunication carrier is alerted to the incident. In an embodiment, the CALEA quality check tool checks a header of the HI3 message to determine if it belongs to a target of a CALEA intercept request and to determine if there is a payload with FROM and TO identified, then determines the if the number in the header is present in the FROM or TO fields.

Another possible CALEA error can happen when session initiation protocol (SIP) messages are intercepted that contain the location information associated not with the targeted subscriber engaged in the bi-directional call but a non-targeted interlocutor. In an embodiment, the CALEA quality check tool is configured with a rule that checks any SIP messages for a location of a non-targeted individual. If an intercepted SIP message contains a location of a non-targeted individual, the intercepted SIP message is not sent to the law enforcement agency, the intercepted SIP message is quarantined, and a responsible party at the telecommunication carrier is alerted to the incident.

The present disclosure teaches a particular technical solution to the technical challenge of implementing CALEA functionality in a telecommunication carrier network. Because the telecommunication carrier is required to process and deliver intercepts to law enforcement within 8 seconds, an automated or computer-based information technology solution is required to timely process and handle the legally mandated task. The complexity of the task of assuring CALEA intercept quality and protecting the privacy rights of US citizens is exacerbated by the large number of different law enforcement agencies (one hundred or more), by the number of different tiers of intercept authorization, by the different CALEA intercept warrant validity periods, and by the constantly evolving telecommunication network technology.

Turning now to FIG. 1, a system 100 is described. In an embodiment, the system 100 comprises a plurality of law enforcement agencies (LEAs) 102, a telecommunication network 104, a plurality of cell sites 108, a first user equipment (UE) 110, and a second UE 112. The UEs 110, 112 may be a mobile phone, a cell phone, a personal digital assistant (PDA), a wearable computer, a headset computer, a laptop computer, a tablet computer, a notebook computer, or another communication device. While the UEs 110, 112 are depicted in FIG. 1 as being communicatively coupled to the network 104 via wireless links to the cell site 108, the UEs 110, 112 may be communicatively coupled to the network 104 by other communication links, for example by one or more wired links or by a wireless link provided by WiFi or other radio technology. In an embodiment, one or more of the cell sites 108 may provide wireless links to the UEs 110, 112 according to a 5G, a long-term evolution (LTE), a code division multiple access (CDMA), a global system for mobile communications (GSM), or other wireless communication protocol.

The network 104 may comprise any number of network elements 106. In some contexts, the network elements 106 may be referred to as network nodes. While shown separately, the cell sites 108 may be considered to be a part of the network 104. In an embodiment, the network elements 106 comprise routers, gateways, home location registers (HLRs), home subscriber servers (HSSs), and other telecommunication service platforms. In an embodiment, the network elements 106 are computer systems that execute virtual network functions (VNFs), where the virtual network functions may be similar to the functions provided by routers, gateways, HLRs, and/or HSSs. In an embodiment, the cell sites 108 may be considered to be network elements 106. The UEs 110, 112 may communicate with each over via the network 104 using voice communication, using short message service (SMS) messaging, using multimedia messaging service (MMS), or using other data communication utilities. Either of the UEs 110, 112 may receive content from a content store 114 via the network. The content may be obtained by internet browsing. The content may be obtained from the content store 114 as a streaming video or other content. The content store 114 is a content storage facility such as a datastore and need not be a "store" in the sense of selling content.

The LEAs 102 may obtain a warrant from a court or other legal authority to intercept communications associated with a targeted UE 110 and/or targeted individual. The LEA 102 may send a request to a telecommunication carrier to intercept communications of the targeted UE 110 and provide the intercepts to the LEA 102, in accordance with CALEA mandates. The request may provide a CALEA case identity, an identity of the targeted UE 110 and/or the targeted individual, a definition of a time duration that the intercept request is valid, and an intercept scope definition. In an embodiment, there may be less than two thousand LEAs 102 and at least twenty-five LEAs 102, at least fifty LEAs 102, at least seventy-five LEAs 102, at least one hundred LEAs 102, at least one hundred and fifty LEAs 102, or at least two hundred LEAs 102. Different LEAs 102 may request that intercepts be provided to them in different data formats.

In an embodiment, the system 100 comprises a CALEA system 120 that may be operated by a telecommunication carrier. In an embodiment, some or all of the CALEA system 120 may be disposed on a premise of a telecommunication carrier, whereby to better provide security and auditability of sensitive CALEA operations. In an embodiment, some or all of the CALEA system 120 may be disposed in a secured area on-premise of a telecommunication carrier, again to better provide security and auditability of sensitive CALEA operations. For example, by containing some or all of the CALEA system 120 in a secured area, access to which is limited to employees of the telecommunications carrier specifically engaged in support of CALEA operations, proving integrity of the CALEA operations and CALEA intercepts may be facilitated.

In an embodiment, the CALEA system 120 comprises a CALEA provisioning tool 122, one or more CALEA mediation devices 124, and a CALEA quality check platform 126. The CALEA quality check platform 126 may be provided by a server computer that executes a quality check tool 128 and a rules engine 130 and that stores a plurality of rules 132. The quality check tool 128 and the rules engine 130 may both be implemented as software or other computer-based logic instructions. In an embodiment, the rules engine 130 may be implemented as a Spark rules engine. In an embodiment, multiple instances of the quality check tool 128 and/or the rules engine 130 may execute concurrently to better support CALEA operational processing loads. In an embodiment, the CALEA quality check platform 126 may be implemented on a plurality of server computers to better support CALEA operational processing loads. In an embodiment, the CALEA provisioning tool 122, the CALEA mediation devices 124, and the CALEA quality check platform 126 may be replicated at a separate physical location to provide georedundancy. In an embodiment, the replicated CALEA resources may operate in a hot-standby mode, wherein the replicated CALEA resources can pick-up CALEA operational processing on short notice if the primary CALEA resources are incapacitated. In another embodiment, the replicated CALEA resources may operate in a coordinated, load-sharing mode at the same time as the primary CALEA resources are handling CALEA operational processing loads.

The LEAs 102 send a CALEA request via the network 104 to the CALEA system 120. This may be in the form of an electronic message sent to a CALEA employee of the telecommunication service provider that operates the CALEA system 120, for example to a CALEA craft 136. Alternatively, the LEAs 102 may send a CALEA request via the network 104 to a request queue or to a group email address, and an available CALEA craft 136 may retrieve the CALEA request from the request queue or from the group email address and handle the CALEA request. The CALEA craft 136 may use the CALEA provisioning tool 122 to store information from the CALEA request in a data store 134. This information may comprise a CALEA case identity, a communication target identity, and an intercept type or intercept level authorization (e.g., definition of scope of the intercept). Alternatively, in an embodiment, the LEAs 102 may send the CALEA request directly to the data store 134. The CALEA provisioning tool 122 may be implemented as software, scripts, or other logic instructions that execute on a computer.

One of the CALEA mediation devices 124 detects an update to the data store 134, retrieves the information about the new CALEA request, and configures and/or provisions network elements 106 and/or network nodes in the network 104 that carry communication traffic to intercept communications defined in the CALEA request and to send a copy of the intercepted communications to the CALEA mediation devices 124. Because different network elements 106 may be provided by different equipment vendors and may execute different CALEA intercept programs, the CALEA mediation devices 124 may use different application programming interfaces (APIs) provided by the different network elements 106 to configure them to intercept communications defined in the CALEA request. The CALEA mediation devices 124 may comprise computers that execute software, scripts, or other logic instructions that implement the functions ascribed herein to the CALEA mediation devices 124.

When a network element 106 intercepts communication in accordance with its CALEA provisioning, it is transmitted to the CALEA mediation devices 124. The communication may be limited to information stipulated by the CALEA request received from the LEA 102. For example, some CALEA requests (e.g., a "pen register" that includes call identifying information which may include the phone number of the party to whom the target of a CALEA request is in communication with along with other information such as time and duration of the communication) only authorize intercepting phone numbers to which a targeted UE 110 dials out to but does not authorize capturing the actual content of the initiated communication. Some intercept information transmitted by the network elements 106 may comprise information or data only and no communication content. Other intercept information transmitted by the network elements 106 may comprise both data and communication content. In an embodiment, the software executing in the network elements 106 that perform CALEA intercepts as provisioned by the CALEA provisioning tool 122 is provided by third-party vendors and is not developed by the telecommunication carrier itself. Thus, network elements 106 may execute CALEA intercept software produced by different third-party vendors, and these different implementations of CALEA intercept software may produce differently formatted intercept messages that are transmitted to the CALEA mediation devices 124. In another embodiment, however, the CALEA networks may be provided with CALEA intercept software developed and maintained by the telecommunication carrier.

In an embodiment, incoming CALEA intercepts may be flowed to the CALEA mediation devices 124. In an embodiment, a TCP/IP listener component or a plurality of TCP/IP listener components may be implemented in the CALEA mediation devices 124 that have the role of listening to and receiving incoming CALEA intercepts and flowing these on to software that processes the CALEA intercept. In an embodiment, incoming CALEA intercepts are placed on a Kafka stream that is supported by the quality check tool 128 and or the CALEA quality check platform 126.

The CALEA mediation devices 124 may format the intercepts into a message in a handover interface 2 (HI2) format or in a handover interface 3 (HI3) format, where the HI2 and HI3 formats are defined by a standards body comprising industry and law enforcement representatives. The HI2 may comprise data about communications and HI3 may comprise the actual communication content, such as voice or communication data. HI2 may be said to comprise call identifying information (CII) or intercept related information (IRI), such as who is involved in the communication (either an individual or a web site), the subject location (if authorized), duration of communication, and possibly other information. HI3 may be said to comprise call content, which in a voice call would be actual audio of the parties to the call talking to each other and which in the case of network events could be content downloaded from a web site or movie being watched on a streaming service. Both HI2 and HI3 formatted messages may include a header which comprises metadata about the intercept, for example a timestamp, a CALEA case identity, an identity of the target communication device or target individual, or other information.

The CALEA mediation devices 124 send the HI2 messages and HI3 messages to the CALEA quality check platform 126, for example to the quality check tool 128 for handling or to a queue in the CALEA quality check platform 126 that the quality check tool 128 obtains new HI2 messages and HI3 messages to quality check. The quality check tool 128 performs a quality check of each HI2 message and each HI3 message received from the CALEA mediation devices 124. HI2 messages and HI3 messages that pass its quality check are transmitted by the quality check tool 128 via the network 104 to the appropriate LEA 102. In an embodiment, a TCP/IP writer component is implemented in the CALEA mediation devices 124 or in the quality check tool 128 or in the CALEA quality check platform 126, and it is the TCP/IP writer that sends the HI2 messages and the HI3 messages that pass quality check to the LEAs 102. In an embodiment, a different instance of the TCP/IP listener component and a different instance of the TCP/IP writer component is instantiated for each different LEA 102.

In an embodiment, the quality check tool 128 invokes the rules engine 130 to check the HI2 messages and the HI3 messages for quality. The rules engine 130 may select rules to execute from the rules 132 based on the HI2 messages or the HI3 messages. In an embodiment, the rules 132 are data artifacts. By adding a new data entry defining a new rule into the rules 132 and restarting the rules engine 130, the rules engine 130 may be updated to perform additional checks, without recompiling and rebuilding the rules engine 130. In some contexts, the rules 132 may be referred to as CALEA message quality rules.

The rules engine 130 may apply the selected rules in a sequence, where failure to pass one of the checks defined by a rule results in short-circuiting the sequence of rules checks and results in quarantining of the subject HI2 message or HI3 message. A quarantined HI2 message or HI3 message is not transmitted to a LEA 102. A CALEA craft 136 and/or a CALEA engineer 138 is notified of the quarantined HI2 message or HI3 message and assigned to perform a root cause analysis for why the subject message failed the quality check performed by the rules engine 130.

Some of the rules compare the content that is intercepted to the information received in the initiating CALEA request associated with a HI2 message or HI3 message received from the mediation devices 124. In an embodiment, a rule checks whether content is allowed to send and whether the content belongs to a target of a CALEA request. In an embodiment, for some messages a rule checks the FROM and TO fields associated with the intercept to assure one of the numbers belongs to a target of a CALEA request. The rule may look up the initiating CALEA request information in the datastore 134. At least some of the rules entail the rules engine 130 performing deep packet inspection of the intercepted communication content.

As an example, in a certain scenario IP packets may be delivered to a targeted device and intercepted by a network element 106 according to a CALEA request, but in fact the IP packets may have been intended for a non-targeted individual. For example, a non-targeted UE 112 may request content, the non-targeted UE 112 may have been assigned a transient IP address when it attached to the radio access network (RAN), and the requested content may be sent to the transient IP address. Before the requested content is delivered to the non-targeted UE 112 it may detach from the network (e.g., device battery is exhausted and device turns off), a targeted UE 110 may attach to the RAN and be assigned the transient IP address previously associated to the non-targeted UE 112, and then the content requested by the non-targeted UE 112 may be delivered instead to the targeted UE 110. The targeted UE 110 may drop the packets, because it determines the IP packets are not really directed to it. The network element 106 may, however, intercept the IP packets because they were in fact delivered to the targeted UE 110. The network element 106 may transmit the intercept to the CALEA mediation device 124, and the CALEA mediation device 124 may erroneously package this intercept in one or more HI2 messages and/or one or more HI3 messages. By performing deep packet inspection on these HI2 messages and HI3 messages, the rules engine 130 can determine if there is a nexus between the receiving targeted device and the device the IP packets were actually intended for. If the nexus is missing, the HI2 messages and/or HI3 messages may be quarantined by the quality check tool 128. In this way, sending inadvertent intercepts of non-targeted devices to LEAs 102 can be prevented.

Other special scenarios can be identified and rules 132 defined to prevent forwarding other inadvertent intercepts to LEAs 102 or forwarding content that exceeds a mandate of an associated CALEA request. For example, sometimes session initiation protocol (SIP) messages may be intercepted that contain a location or a proxy location of a non-targeted UE 112. At least in some CALEA requests, the location of a non-targeted UE 112 must not be transmitted to the LEAs 102. In the case where the location of a non-targeted UE 112 is inadvertently intercepted, the associated HI2 and/or HI3 messages can be quarantined.

Some of the rules 132 define a HI2 message format and/or a HI3 message format for use with a particular LEA 102 that initiated a CALEA request. If a HI2 message or a HI3 message is found by the rules engine 130 to not comply with the message format stipulated by the LEA 102 that initiated an associated CALEA request, the HI2 message and/or HI3 message can be quarantined. Some of the rules 132 are directed to checking the current time versus an expiration date of an associated CALEA request, whereby to avoid transmitting communication intercepts from a targeted device after expiration of a CALEA warrant. If the rules engine 130 finds that an HI2 message and/or an HI3 message is associated with an expired CALEA warrant, the messages can be quarantined. The rules engine 130 and/or the quality check tool 128 can check the content of the HI2 messages and/or HI3 messages to make sure that the information contained in the messages does not exceed the mandate of the associated CALEA request.

The quality check tool 128 and/or the rules engine 130 may check to assure that HI3 messages are paired with an associated HI2 message when transmitting to the LEAs 102. If the LEAs 102 receive an HI3 message without an associated HI2 message, the LEA 102 may not know how to interpret or construct the HI3 message. If an HI3 message is generated without an associated HI2 message, the HI3 message can be quarantined.

In an embodiment, the CALEA system 120 is configured to transmit intercepted communications that are not quarantined to LEAs 102 in less than 8 seconds after the communication is intercepted by the network element 106. In an embodiment, the CALEA system 120 is configured to transmit intercepted communications that are not quarantined to LEAs 102 in less than 10 seconds after the communication is intercepted by the network element 106. In an embodiment, the CALEA system 120 is configured to transmit intercepted communications that are not quarantined to LEAs 102 in less than 15 seconds after the communication is intercepted by the network element 106.

Quarantined HI2 message and HI3 messages are not sent to LEAs 102. Quarantined HI2 messages and HI3 messages are analyzed by a CALEA craft 136 by a CALEA engineer 138 to determine a root cause of the messages failing the quality check. Based on the determination of root cause, vendors of CALEA intercept tools and/or software in the network elements 106 may be directed to fix their tools or software to avoid repetition of the errored intercepts in the future. Based on determination of root causes, the process of provisioning CALEA intercepts in response to CALEA requests received from LEAs 102 may be adapted and/or changed to prevent repletion of the errored intercepts in the future.

Figure 2A:
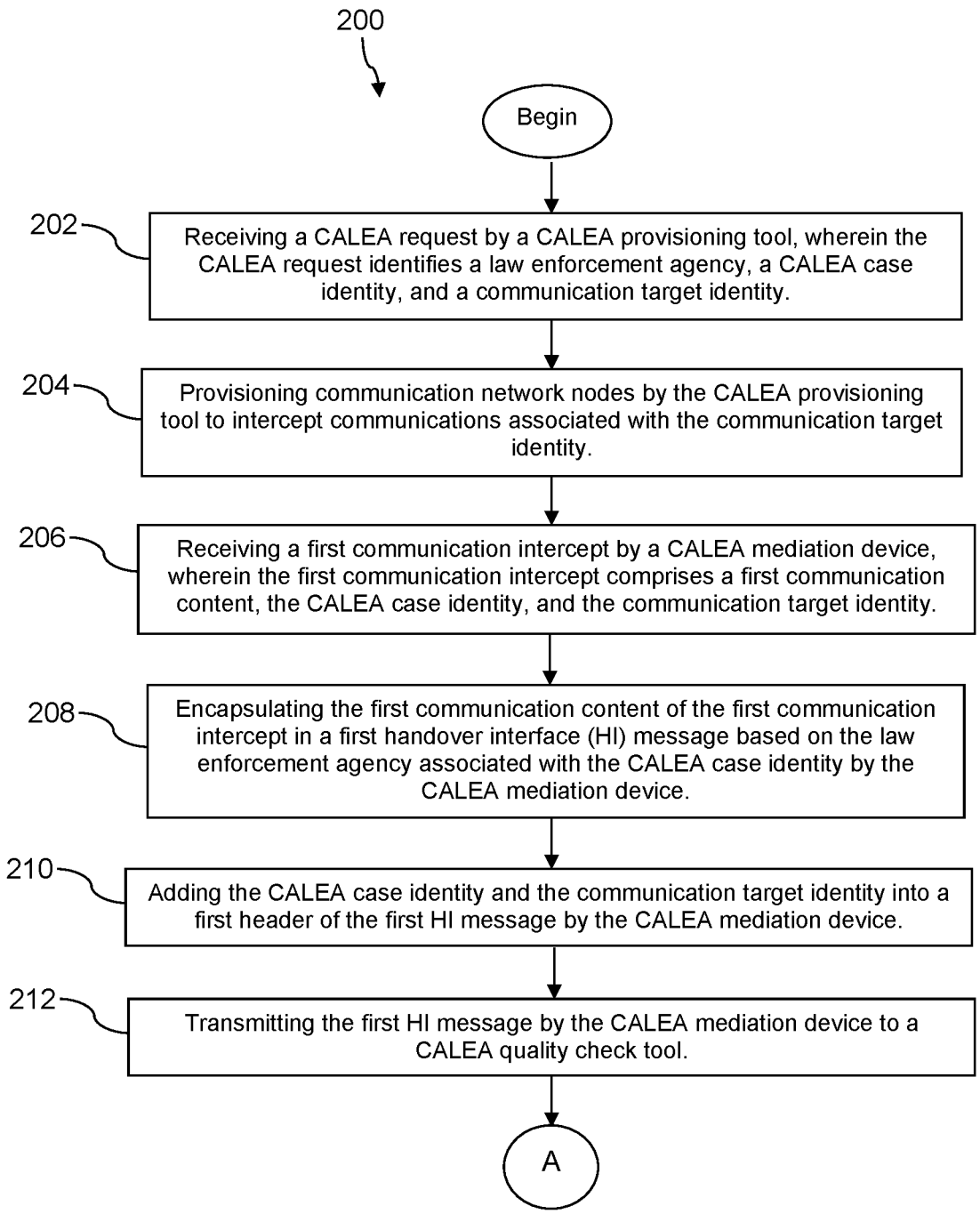
FIG. 2A and FIG. 2B are a flow chart of a method according to an embodiment of the disclosure.
Figure 2B:
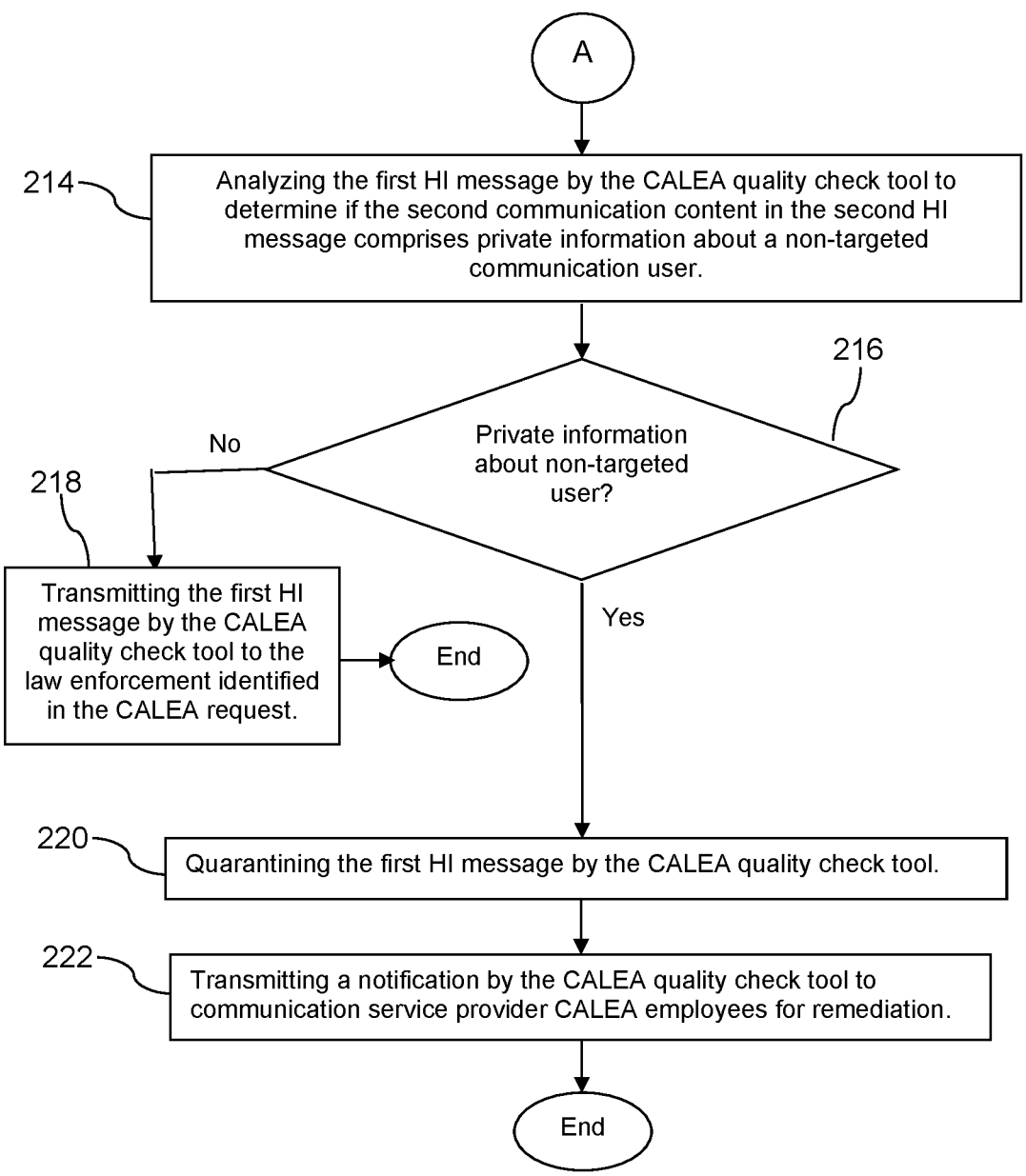

Turning now to FIG. 2A and FIG. 2B, a method 200 is described. In an embodiment, the method 200 is a method of handling communications intercepts produced by a communication network to assure compliance with communications assistance for law enforcement act (CALEA) requests. At block 202, the method 200 comprises receiving a CALEA request by a CALEA provisioning tool, wherein the CALEA request identifies a law enforcement agency, a CALEA case identity, and a communication target identity. In an embodiment, the CALEA provisioning tool receives the CALEA request from an input from a workstation operated by an employee of a telecommunication carrier. For example, a CALEA craft 136 receives the CALEA request from a LEA 102, and the CALEA craft 136 operates an interface of the CALEA provisioning tool 122 to input the CALEA request. In an embodiment, the LEA 102 may electronically transmit a CALEA request to the telecommunication carrier, and a CALEA craft 136 may send the information needed to set-up the requested intercept and/or surveillance using an API of the CALEA mediation devices 124.

At block 204, the method 200 comprises provisioning communication network nodes by the CALEA provisioning tool to intercept communications associated with the communication target identity. At block 206, the method 200 comprises receiving a first communication intercept by a CALEA mediation device, wherein the first communication intercept comprises a first communication content, the CALEA case identity, and the communication target identity.

At block 208 the method 200 comprises encapsulating the first communication content of the first communication intercept in a first handover interface (HI) message based on the law enforcement agency associated with the CALEA case identity by the CALEA mediation device. In an embodiment, the first HI message is a handover interface 2 (HI2) formatted message. In an embodiment, the first HI message is a handover interface 3 (HI3) formatted message. At block 210, the method comprises adding the CALEA case identity and the communication target identity into a first header of the first HI message by the CALEA mediation device. At block 212, the method 200 comprises transmitting the first HI message by the CALEA mediation device to a CALEA quality check tool.

At block 214, the method 200 comprises analyzing the first HI message by the CALEA quality check tool to determine if the first communication content in the first HI message comprises private information about a non-targeted communication user. The processing of block 214 is represented as decision diamond 216 in FIG. 2B. When the first communication content in the first HI message does not comprise private information about a non-targeted communication user, the method 200 flows to block 218: transmitting the first HI message by the CALEA quality check tool to the law enforcement identified in the CALEA request. When the first communication content in the first HI message does comprise private information about a non-targeted communication user, at block 220 the method 200 comprises quarantining the first HI message by the CALEA quality check tool. At block 222, the method 200 comprises transmitting a notification by the CALEA quality check tool to communication service provider CALEA employees (e.g., CALEA craft 136 employees or CALEA engineer employees of the service provider) for remediation.

In an embodiment, the method 200 further comprises receiving a second communication intercept by the CALEA mediation device, wherein the second communication intercept comprises a second communication content, the CALEA case identity, and the communication target identity; encapsulating the second communication content of the second communication intercept in a second handover interface (HI) message based on the law enforcement agency associated with the CALEA case identity by the CALEA mediation device; adding the CALEA case identity and the communication target identity into a second header of the second HI message by the CALEA mediation device; transmitting the second HI message by the CALEA mediation device to the CALEA quality check tool; analyzing the second HI message by the CALEA quality check tool to determine if the second communication content in the second HI message comprises private information about a non-targeted communication user; and, when the second communication content in the second HI message does comprise private information about a non-targeted communication user, quarantining the second HI message by the CALEA quality check tool.

Figure 3:
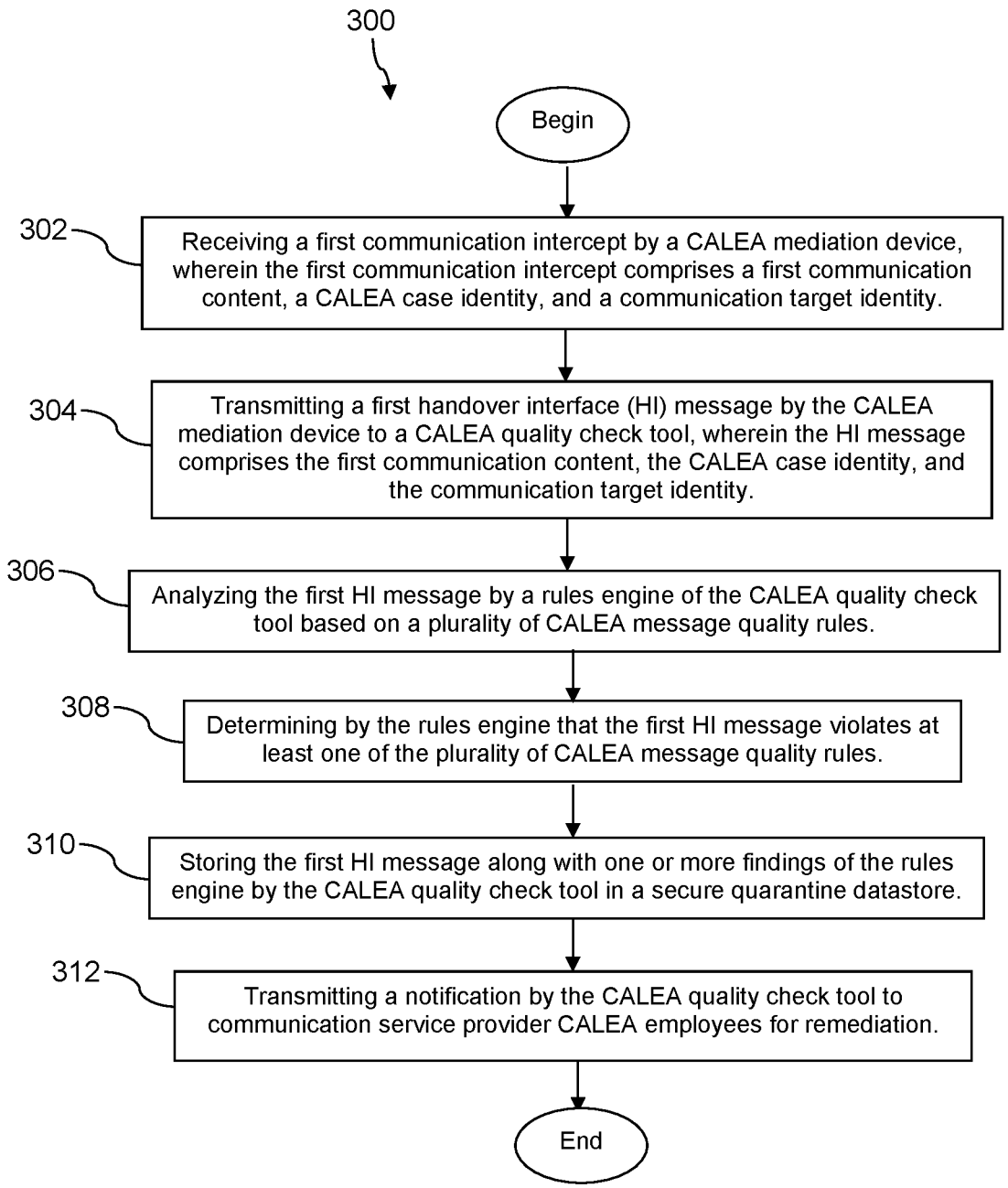
FIG. 3 is a flow chart of another method according to an embodiment of the disclosure.

Turning now to FIG. 3, a method 300 is described. In an embodiment, the method 300 is a method of handling communications intercepts produced by a communication network to assure compliance with communications assistance for law enforcement act (CALEA) requests. At block 302, the method 300 comprises receiving a first communication intercept by a CALEA mediation device from a communication network node, wherein the first communication intercept comprises a first communication content, a CALEA case identity, and a communication target identity.

At block 304, the method 300 comprises transmitting a first handover interface (HI) message by the CALEA mediation device to a CALEA quality check tool, wherein the HI message comprises the first communication content, the CALEA case identity, and the communication target identity. At block 306, the method 300 comprises analyzing the first HI message by a rules engine of the CALEA quality check tool based on a plurality of CALEA message quality rules. In an embodiment, one of the plurality of CALEA message quality rules addresses formatting of HI messages. In an embodiment, one of the plurality of CALEA message quality rules addresses expiration deadlines of a CALEA warrant. In an embodiment, one of the plurality of CALEA message quality rules addresses avoiding including location information of a non-targeted communication device in a HI message. In an embodiment, analyzing the first HI message by the rules engine of the CALEA quality check tool entails deep packet inspection of a intercept content of the first HI message.

At block 308, the method 300 comprises determining by the rules engine that the first HI message violates at least one of the plurality of CALEA message quality rules. At block 310, the method 300 comprises storing the first HI message along with one or more findings of the rules engine by the CALEA quality check tool in a secure quarantine datastore. At block 312, the method 300 comprises transmitting a notification by the CALEA quality check tool to communication service provider CALEA employees for remediation. In an embodiment, the method 300 further comprises installing revised CALEA intercept instructions in at least one of a plurality of communication network nodes to remediate the at violation of the at least one of the CALEA quality rules.

Figure 4A:
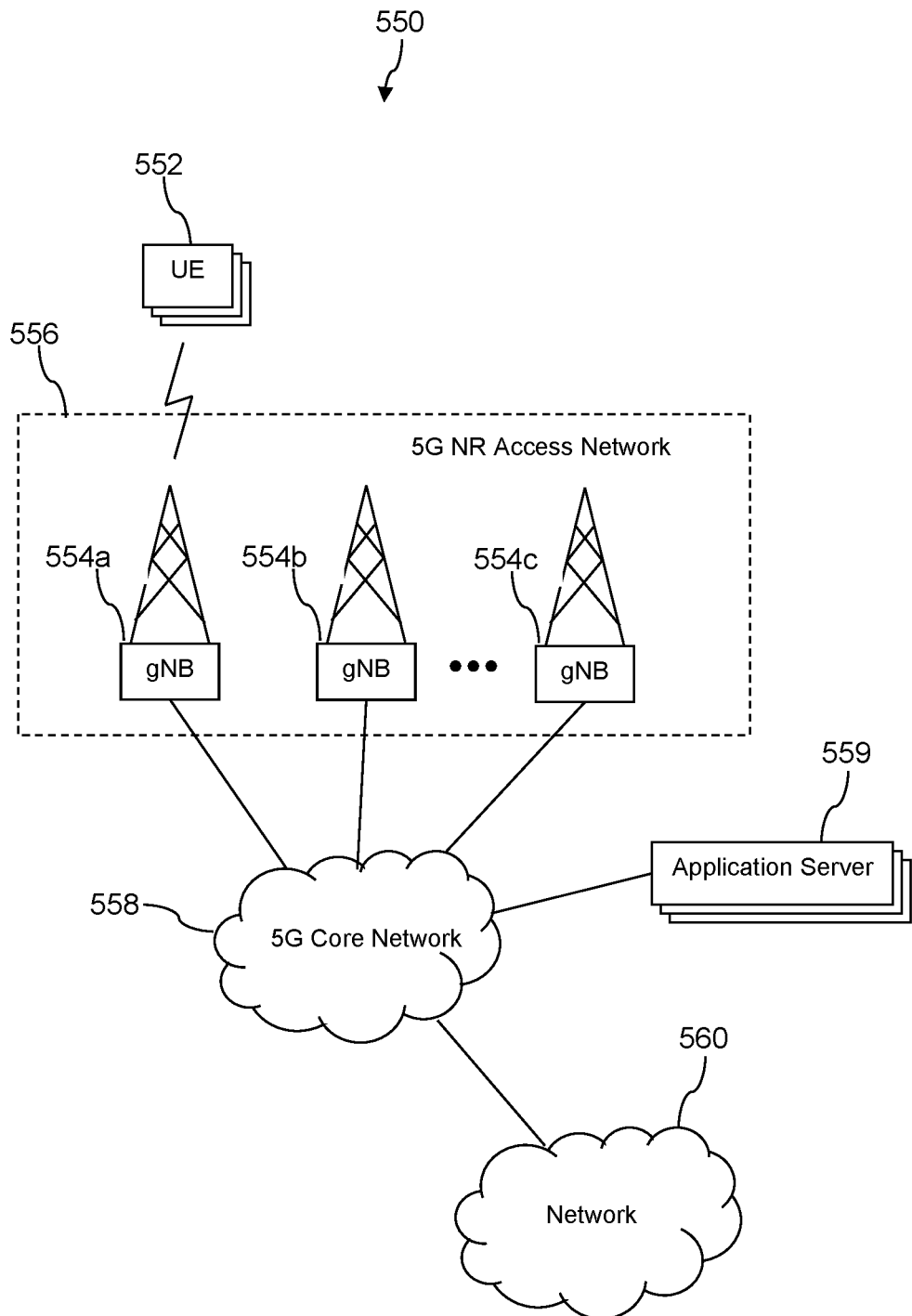
FIG. 4A and FIG. 4B are a block diagram of a communication network according to an embodiment of the disclosure.

Turning now to FIG. 4A, an exemplary communication system 550 is described. At least a part of the network 104 and at least some of the cell sites 108 described above with reference to FIG. 1 may be implemented in accordance with the communication system 550. Typically the communication system 550 includes a number of access nodes 554 (e.g., cell sites) that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a next Generation Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
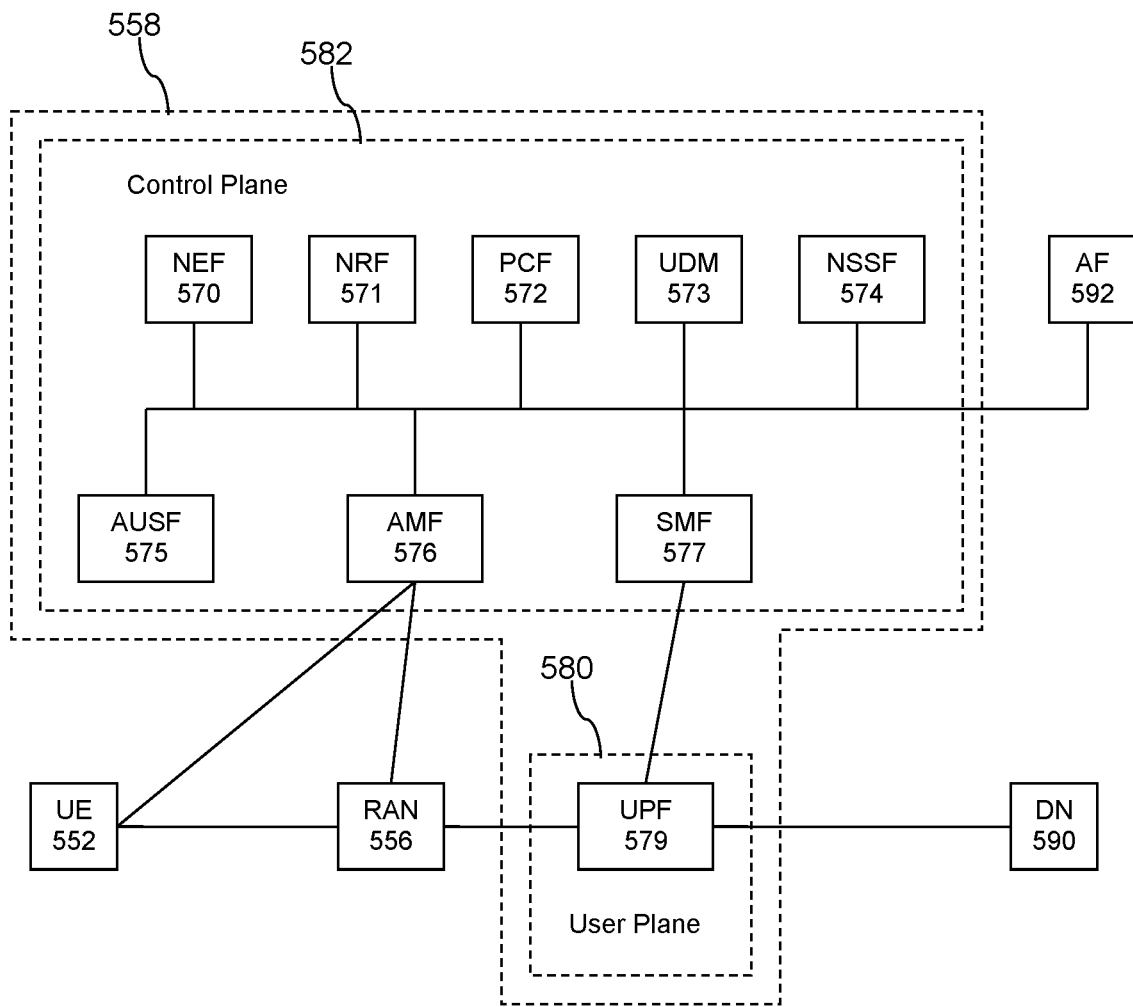

Turning now to FIG. 4B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 5:
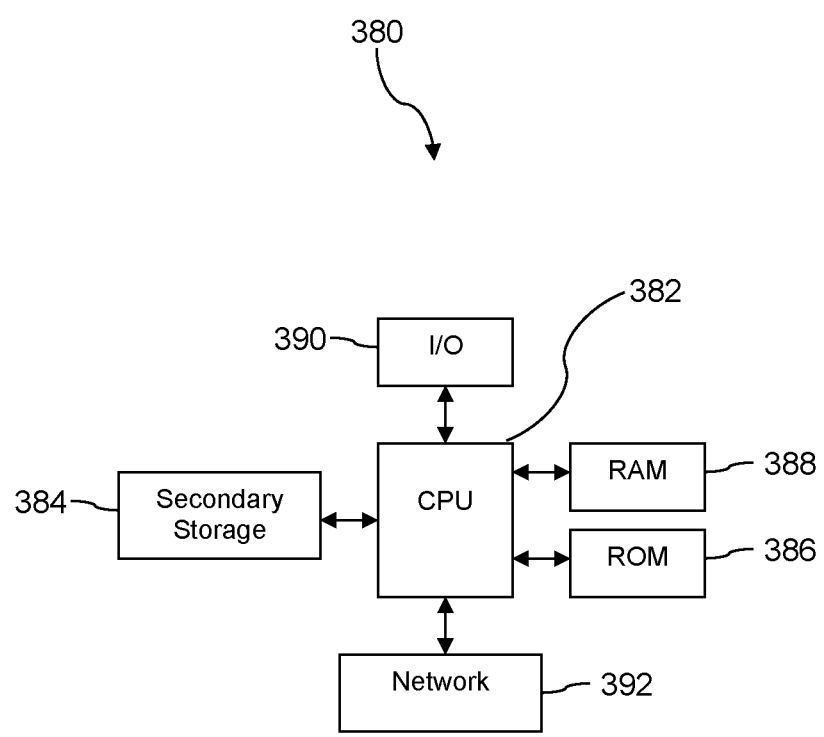
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of handling communications intercepts produced by a communication network to assure compliance with communications assistance for law enforcement act (CALEA) requests, comprising:
   receiving a first communication intercept by a CALEA mediation device from a communication network node, wherein the first communication intercept comprises a first communication content, a CALEA case identity, and a communication target identity;
   transmitting a first handover interface (HI) message by the CALEA mediation device to a CALEA quality check tool, wherein the first HI message comprises the first communication content, the CALEA case identity, and the communication target identity;
   analyzing the first HI message by a rules engine of the CALEA quality check tool based on a plurality of CALEA message quality rules;
   determining by the rules engine that the first HI message violates at least one of the plurality of CALEA message quality rules;
   storing the first HI message along with one or more findings of the rules engine by the CALEA quality check tool in a secure quarantine datastore; and
   transmitting a notification by the CALEA quality check tool to communication service provider CALEA employees for remediation.

2. The method of claim 1, further comprising installing revised CALEA intercept instructions in at least one of a plurality of communication network nodes to remediate the at violation of the at least one of the CALEA quality rules.

3. The method of claim 1, wherein one of the plurality of CALEA message quality rules addresses formatting of HI messages.

4. The method of claim 1, wherein one of the plurality of CALEA message quality rules addresses expiration deadlines of a CALEA warrant.

5. The method of claim 1, wherein one of the plurality of CALEA message quality rules addresses avoiding including location information of a non-targeted communication device in a HI message.

6. The method of claim 1, wherein analyzing the first HI message by the rules engine of the CALEA quality check tool entails deep packet inspection.

7. The method of claim 1, further comprising:
   receiving a CALEA request by a CALEA provisioning tool, wherein the CALEA request identifies a law enforcement agency, the CALEA case identity, and the communication target identity; and
   provisioning communication network nodes by the CALEA provisioning tool to intercept communications associated with the communication target identity.

8. The method of claim 7, wherein the CALEA provisioning tool receives the CALEA request from an input from a workstation operated by an employee of a telecommunication carrier.

9. The method of claim 7, wherein the CALEA provisioning tool receives the CALEA request via an application programming interface (API) extended to law enforcement agencies.

10. The method of claim 1, further comprising:
    before transmitting the first HI message to the CALEA quality check tool, encapsulating the first communication content of the first communication intercept in the first HI message based on a law enforcement agency associated with the CALEA case identity by the CALEA mediation device; and adding the CALEA case identity and the communication target identity into a first header of the first HI message by the CALEA mediation device.

11. The method of claim 1, wherein the first HI message is a handover interface 2 (HI2) formatted message.

12. The method of claim 1, wherein the first HI message is a handover interface 3 (HI3) formatted message.

13. The method of claim 1, further comprising:
receiving a second communication intercept by the CALEA mediation device from the communication network node, wherein the second communication intercept comprises a second communication content, the CALEA case identity, and the communication target identity;
transmitting a second HI message by the CALEA mediation device to the CALEA quality check tool, wherein the second HI message comprises the second communication content, the CALEA case identity, and the communication target identity;
analyzing the second HI message by the rules engine of the CALEA quality check tool based on the plurality of CALEA message quality rules;
determining by the rules engine that the second HI message satisfies the plurality of CALEA message quality rules; and
in response to determining that the second HI message satisfies the plurality of CALEA message quality rules, transmitting the second HI message by the CALEA quality check tool to a law enforcement agency associated with the CALEA case identity.

14. The method of claim 13, further comprising:
before transmitting the second HI message to the CALEA quality check tool,
encapsulating the second communication content of the second communication intercept in the second HI message based on the law enforcement agency associated with the CALEA case identity by the CALEA mediation device; and
adding the CALEA case identity and the communication target identity into a second header of the second HI message by the CALEA mediation device.

15. The method of claim 13, wherein the second HI message is a handover interface 2 (HI2) formatted message.

16. The method of claim 13, wherein the second HI message is a handover interface 3 (HI3) formatted message.

17. The method of claim 13, wherein determining that the second HI message satisfies the plurality of CALEA message quality rules comprises determining that the second communication content in the second HI message does not comprise private information about a non-targeted communication user.

18. The method of claim 13, wherein the second HI message is transmitted to the law enforcement agency in less than 10 seconds after the second communication is intercepted by the communication network node.

19. The method of claim 1, wherein determining that the first HI message violates the at least one of the plurality of CALEA message quality rules comprises determining that the first communication content in the first HI comprises private information about a non-targeted communication user.

20. The method of claim 1, wherein the CALEA mediation device and the CALEA quality check tool are located in a secured area on-premise of a telecommunication carrier.

* * * * *